J. H. J. O'NEILL.
Thill-Coupling.

No. 58,465.

Patented Oct. 2, 1866.

UNITED STATES PATENT OFFICE.

JOHN H. J. O'NEILL, OF NEW HAVEN, CONNECTICUT.

IMPROVEMENT IN CARRIAGE-SHACKLES.

Specification forming part of Letters Patent No. 58,465, dated October 2, 1866.

*To all whom it may concern:*

Be it known that I, JOHN H. J. O'NEILL, of New Haven, in the county of New Haven and State of Connecticut, have invented a new Improvement in Carriage-Shackles; and I do hereby declare the following, when taken in connection with the accompanying drawings and the letters of reference marked thereon, to be a full, clear, and exact description of the same, and which said drawings constitute part of this specification, and represent, in—

Figure 1:
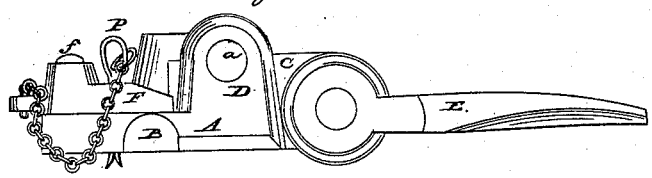
Figure 2:
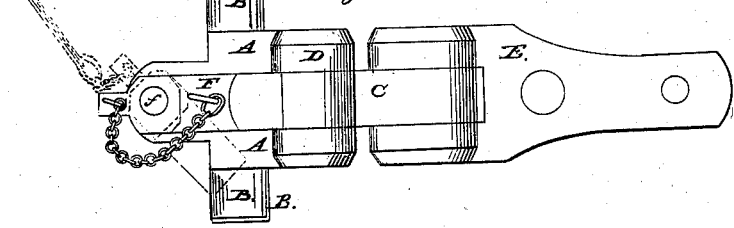

Figure 1, a side view; Fig. 2, a top view, and in Fig. 3 a longitudinal central section.

This invention relates to an improvement in the attachment of carriage shafts or pole to a carriage, its object being to dispense with bolts, such as are commonly used, and so that the shafts may be attached or detached with the greatest ease; and to enable others to construct and apply my improvement, I will proceed to describe the same, as illustrated in the accompanying drawings.

Figure 3:
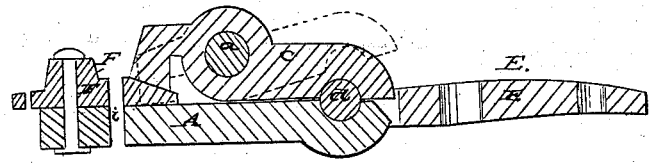

A is the base of the shackle, secured to the axle by bands passing over lugs B, formed on the base A. C is a lever hung to the said base upon a pivot, *a*, between ears D. The forward end of the lever C and of the base A receive the shaft-coupling E, and the two together, as seen in Fig. 3, grasp the pivot *a*, which is formed in the end of the coupling E. At the rear end of the lever C, and upon the base A, I fix a cam, F, hung to the said base by a pivot, *f*. The rear end of the lever C and the cam F are formed as seen in Fig. 3, so that when the said cam is below the rear end of the lever C the forward end of the said lever C is held firmly down upon the base, forming a strong connection for the shaft-coupling; but when the said cam F is turned from beneath the lever C, as denoted in red, Fig. 2, the said lever may be raised to the position denoted in red, Fig. 3, in which position the coupling E may be removed or attached, as the case may be. When the coupling E is in place and the cam F turned to the position denoted in black, I insert a pin, P, (see Fig. 1,) through a hole, *i*, passing through both cam and base. (See Fig. 3.) This secures the cam in its place, and prevents its accidental displacement. This pin I make an ordinary spring-pin, (see Fig. 1,) which is easily removed when it is required to remove or change the couplings. The said pin is attached to the shackle by a small chain or otherwise to prevent its loss.

Having therefore thus fully described my invention, what I claim as new and useful, and desire to secure by Letters Patent, is—

The combination of the base A and the lever C, hinged thereto, with a cam, F, pivoted to the base A, constructed and arranged to operate substantially in the manner and for the purpose specified.

J. H. J. O'NEILL.

Witnesses:
JOHN E. EARLE,
JOHN H. SHUMWAY.